United States Patent
Liao et al.

(10) Patent No.: US 8,385,939 B2
(45) Date of Patent: Feb. 26, 2013

(54) METHOD AND APPARATUS FOR SCHEDULING RESOURCES AND AVOIDING INTERFERENCE IN A MULTI-CELLULAR WIRELESS COMMUNICATION SYSTEM

(75) Inventors: Jingyi Liao, Beijing (CN); Lei Wan, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 557 days.

(21) Appl. No.: 12/377,534

(22) PCT Filed: Dec. 20, 2006

(86) PCT No.: PCT/EP2006/012344
§ 371 (c)(1), (2), (4) Date: Feb. 8, 2010

(87) PCT Pub. No.: WO2008/019706
PCT Pub. Date: Feb. 21, 2008

(65) Prior Publication Data
US 2010/0130223 A1    May 27, 2010

(30) Foreign Application Priority Data
Aug. 15, 2006    (SE) ...................................... 0601690

(51) Int. Cl.
*H04W 72/00*    (2009.01)

(52) U.S. Cl. ...................... 455/453; 455/450; 455/452.2
(58) Field of Classification Search .................. 455/450, 455/452.2, 453
See application file for complete search history.

(56) References Cited

U.S. PATENT DOCUMENTS

| | | | |
|---|---|---|---|
| 7,826,471 B2 * | 11/2010 | Wilson et al. ................. | 370/442 |
| 2002/0159403 A1 * | 10/2002 | Reddy ............................ | 370/316 |
| 2004/0037263 A1 * | 2/2004 | Zeira ............................. | 370/347 |
| 2004/0235527 A1 * | 11/2004 | Reudink et al. ............... | 455/561 |
| 2005/0070266 A1 | 3/2005 | Senarath et al. | |
| 2005/0094602 A1 | 5/2005 | Gollamudi et al. | |
| 2009/0296574 A1 * | 12/2009 | Liao et al. ..................... | 370/230 |
| 2009/0296663 A1 * | 12/2009 | Wild ............................. | 370/335 |

FOREIGN PATENT DOCUMENTS

| | | |
|---|---|---|
| EP | 1 528 830 A1 | 5/2005 |
| WO | WO 03/021993 A1 | 3/2003 |

* cited by examiner

*Primary Examiner* — Marisol Figueroa

(57) ABSTRACT

Resources in a multi-cellular wireless communication system are scheduled. A beam pattern associated with at least one mobile terminal located within one of the cells is identified and assigned to a slot, providing at least one stream to said at least one mobile terminal. At least one other mobile terminal located within said cell having the same beam pattern associated therewith as that of said identified beam pattern to be served during said slot is scheduled. The assigned beam pattern in said cell is communicated to at least one interfering cell.

32 Claims, 8 Drawing Sheets

METHOD AND APPARATUS FOR SCHEDULING RESOURCES AND AVOIDING INTERFERENCE IN A MULTI-CELLULAR WIRELESS COMMUNICATION SYSTEM

FIELD OF THE INVENTION

The present invention relates to a method and apparatus for scheduling resources in a multi-cellular wireless communication system. It also relates to a method and apparatus for avoiding interference in a multi-cellular wireless communication system.

BACKGROUND OF THE INVENTION

A base station of a cellular wireless communication system consists of an antenna, which transmits and receives signals from mobile terminals within that cell. Often, advanced antenna arrangements are used in such systems. These consist of an array of antennas, known as a smart antenna array. Smart antenna arrays (or multi-antennas) significantly increase the capacity and coverage of cellular systems. Thus form multi-beams, which are classified depending on the applied beam forming method.

One such beam forming method is fixed beam forming (also referred to as switched beam forming). In the fixed beam forming method, there exists a set of predefined beams with fixed pointing directions that cover a specific area. Typically, each of the predefined beams serves more than one mobile terminal.

Another such method is adaptive beam forming (also referred to as steerable beam forming). In the adaptive beam forming method, the weights of the antenna array are adapted to maximize a certain number of desired criteria. For example, adaptive beam forming could be used to attenuate or eliminate interferers that arrive with Direction of Arrival (DOA) near to the desired signals. Fixed beam forming does not have the same flexibility as adaptive beam forming. However, it has other advantages, such as being easy to implement, widely available and cheap. In addition, if a sufficient number of beams are used in the fixed beam forming method, then the performance of this method can approach that of the adaptive beam forming method.

An extensive evaluation of advanced antennas in wireless networks using Wideband Code Division Multiple Access WCDMA has been well documented. An example can be found in "Downlink capacity comparison between different smart antenna concepts in a mixed service WCDMA system", M. Ericson, A. Osseiran, J. Barta, B. Göransson and B. Hagerman, proceedings IEEE Vehicular technology conference, Fall, Atlantic City, USA, 2001, vol. 3, pp. 1528-1532.

Beam forming schemes such as Transmission Antenna Array (TxAA) have been implemented in the 3rd Generation Partnership Project (3GPP). Examples can be found in "Technical Specification Group Radio Access Network, Physical layer procedures (FDD)", 3GPP TS 25.214, March 2006 and in "MIMO Reference Cases", Nokia, 3GPP R1-040439, TSG-RAN WG1 #37 Meeting, May 2004.

Further to the beam forming methods, it is also necessary to employ a selection method that establishes when each mobile terminal is to receive data from the base station. The method of scheduling used can achieve multi-user diversity gain for the smart antenna system.

One such scheduling method that can be used is a deterministic scheduling scheme. In a deterministic scheduling scheme, conventional round robin scheduling is used, which schedules mobile terminals based on some certain orders or rules. The base station then transmits using the available physical resources to the scheduled mobile terminal. The round robin scheduling scheme is channel independent.

Another scheduling method that can be used is an opportunistic scheduling scheme, which applies to a system with multi-antennas and multiple users. An opportunistic scheduling scheme uses a Channel State Indicator (CSI) or other mobile terminal information. For example, the mobile terminals estimate and feedback their instantaneous downlink (DL) Signal to Noise Ratio (SNR) to the base station and the base station then transmits to the mobile terminal reporting the best quality. In other words, each mobile terminal receives data from the base station when their channel peaks. This opportunistic method can combat frequency-selective fading, which is a propagation anomaly caused by partial cancellation of a signal by itself. It occurs since the signal reaching the receiving antenna arrives by two or more paths (multi-paths), and at least one of the paths is changing (lengthening or shortening).

A description of the opportunistic and deterministic scheduling schemes can be found in "Opportunistic Beamforming with Limited Feedback", Shahab Sanayei and Aria Nosratinia, accepted in the Asilomar Conference on Signals, Systems and Computers, Oct. 28-Nov. 1, 2005, pages 648-652.

It is also possible to counteract the effect of frequency-selective fading by applying a transmission scheme, such as Orthogonal Frequency Division Multiple Access (OFDMA) modulation. In the OFDMA scheme, the transmission bandwidth is divided into a set of narrowband resource blocks. Different resource blocks are then allocated to different mobile terminals. In other words, there exists a dynamic resource block assignment (or scheduling) that provides a flexible multi-user access scheme. The scheduling scheme used for the resource block assignment could be, for example, a proportional fair scheduling scheme, such as that disclosed in U.S. Pat. No. 6,807,426, which uses a variety of combinations of channel condition metrics and user fairness metrics for a WCDMA system. However, the proportional fair scheduling scheme can easily extend to an OFDMA system. Such a scheme will be presented here as "proportional fair scheduling in both time and frequency domain" (PFTF). PFTF is used to perform a proportional fair scheduling in time and frequency domain based on the throughput for each mobile terminal and the channel quality measurements for each resource block per mobile terminal. The PFTF scheme achieves resource fairness by providing a fair sharing of transmission time that is proportional to the past throughputs of mobile terminals over a fixed window length. The PFTF scheduling scheme is channel dependent.

A further scheduling technique can be found in EP 1224747, in which the scheduling information is attached to data blocks and the data blocks are transmitted to the desired users. A comprehensive summary of scheduling techniques can be found in "Adaptive sub-carrier and power allocation in OFDM based on maximizing utility", Guocong Song and Ye (Geoffrey) Li, Vehicular Technology Conference, 2003, VTC 2003-Spring, The 57th IEEE Semi-annual, Volume 2, pp 22-25 Apr. 2003. Further summaries can be found in U.S. Pat. No. 6,807,426 and in "Scheduling algorithms for HS-DSCH in a WCDMA mixed traffic scenario", M. Kazmi and N. Wiberg, International symposium on personal, indoor and mobile radio communications (PIMRC), Beijing, China, September 2003.

WO 03/021993 discloses a transceiver for use in a wireless access network comprising a plurality of base stations, which each transmit data to several subscribers that are directionally along the same antenna beam in consecutive bursts.

US 2005/070266 discloses a method and apparatus for reducing signal interference within a cellular radio system by altering the direction of beams within cell sectors among discrete angular positions according to a predetermined, cyclic pattern.

EP 1,528,830 discloses a communication system that includes a scheduler that assigns the same system resources for use during a simultaneous data transmission to a receiver in each of the coverage envelopes provided that the coverage envelopes do not overlap.

EP 1,184,938 discloses a load sharing system and method using a cylindrical antenna array in which antenna array components are adjusted to share loads among sectors of a cell or between cells.

However, the problem that exists is that if the pattern of the beams (beam patterns) in interfering cells is not known, then it is impossible to achieve an accurate channel quality estimation, which vastly reduces the system performance. This becomes more serious for OFDMA systems when a channel dependent scheduling scheme is employed on resource block level, since it is impossible for one cell to know the beam pattern selection of interfering cells in each resource block. It is also impossible to prevent inter-cell interference without knowing the beam patterns in interfering cells. Furthermore, when there are many mobile terminals with different beam patterns to be scheduled per slot, the implementation becomes complex and downlink (DL) and uplink (UL) signaling overhead is greater.

Improvement and simplification is therefore required for a multi-user wireless communication system that can achieve accurate channel quality estimation, reduced inter-cell interference, a simple transmit structure and reduced signaling overhead.

SUMMARY OF THE INVENTION

The present invention seeks to provide a method for scheduling, with the consideration of interference suppression, benefit for channel quality estimation and simple implementation, especially for multi-user smart antenna systems, and furthermore, a method for reducing signaling overhead, especially for an OFDMA smart antenna system with frequency domain scheduling.

This is achieved according to an aspect of the present invention by a method for scheduling resources in a multi-cellular wireless communication system, the method comprising the steps of: identifying a beam pattern associated with at least one mobile terminal located within one of the cells; assigning said identified beam pattern to a slot, said slot comprises a plurality of resource blocks, said identified beam pattern providing at least one stream to said at least one mobile terminal; scheduling at least one other mobile terminal located within said cell having the same beam pattern associated therewith as that of said identified beam pattern to be served during said slot for a resource block.

This is also achieved according to another aspect of the present invention by an apparatus for scheduling resources in a multi-cellular wireless communication system, the apparatus comprising: an identifier for identifying a beam pattern associated with at least one mobile terminal located within one of the cells; means for assigning said identified beam pattern to a slot, said slot comprises a plurality of resource blocks, said identified beam pattern providing at least one stream to said at least one mobile terminal; a scheduler for scheduling at least one other mobile terminal located within said cell having the same beam pattern associated therewith as that of said identified beam pattern to be served during said slot for a resource block.

This is also achieved according to another aspect of the present invention by a system comprising a plurality of cells, each cell comprising: at least one mobile terminal located within one of said plurality of cells; a base station, said base station comprising: an antenna array for transmitting at least one beam pattern; a beam forming means for forming said at least one beam pattern; an identifier for identifying a beam pattern transmitted by the antenna array associated with at least one mobile terminal located within one of the cells; means for assigning said identified beam pattern to a slot, said slot comprises a plurality of resource blocks, said identified beam pattern providing at least one stream to said at least one mobile terminal; a scheduler for scheduling at least one other mobile terminal located within said cell having the same beam pattern associated therewith as that of said identified beam pattern to be served during said slot for a resource block.

A stream is herein defined as several modulated symbols sent in parallel using the same physical resource, e.g. code in CDMA or time-frequency block in OFDM. A slot is defined as a transmission time entity that can consist of several symbols. In WCDMA a slot is defined as 2560 chips (⅔ ms). In LTE, a slot can be defined as a group of 6-7 OFDM symbols.

The beam pattern may be formed such that a predefined beam has a direction serving more than one mobile terminal. It is to be noted that the direction of the beam is not limited to the geographical direction but may, for example, refer to direction in a radio channel propagation sense. In other words, mobile terminals that are covered by a particular beam pattern do not necessarily have to be located in the same geographical direction from the antenna, but are covered by the particular beam pattern in a radio sense.

The present invention thus achieves a simple transmit structure since only one beam pattern is assigned to a slot. It is to be noted that the beam pattern may, for example, comprise two polarizations (+/−45° or V/H) formed in the same direction.

The present invention also achieves accurate channel quality estimation by assigning only one beam pattern to a slot. Furthermore, the signalling overhead is reduced in the present invention since only mobile terminals having the same beam pattern are allocated to a resource block in said slot.

In one embodiment of the present invention, the step of assigning said identified beam pattern for each slot comprises assigning said identified beam pattern according to a round robin mechanism for all the beams having at least one active mobile terminal to cover. In this way, the step of assigning said identified beam pattern for each slot is simplified.

In a second embodiment of the present invention, the step of assigning said identified beam pattern for each slot comprises assigning said identified beam pattern based on the traffic load of each beam, such that beams having a higher load are scheduled as a priority.

The method for scheduling resources in a multi-cellular wireless communication system may further comprises the steps of: determining the optimal beam sequences of interfering cells for at least one subsequent slot, said determination being based on a pre-defined criteria; communicating the selected beam pattern for each slot based on said determined beam sequences to at least one interfering cell.

In one embodiment of such a method, the step of determining the optimal beam sequences for said at least one subsequent slot comprises determining the optimal beam sequences based on the criteria of obtaining the maximum system throughput.

In a second embodiment of such a method, the step of determining the optimal beam sequences for said at least one subsequent slot comprises determining the optimal beam sequences based on the criteria of finding the beam sequences with a minimum system inter-cell interference for each slot.

In a preferred embodiment of the present invention, each cell decides its next best served beams from the determined beam sequences for the next slot or slots based on the predefined criteria. In this way, the inter-cell interference is reduced and the maximum system throughput is achieved.

In one embodiment of the present invention, the step of determining the optimal beam sequences and the step of communicating the beam sequences of the interfering cells comprises determining the optimal beam sequences and communicating said beam sequences in at least one central node and then transmitting or broadcasting from said central node to all interfered cells.

In a second embodiment of the present invention, the step of determining the optimal beam sequences and the step of communicating the beam sequences of the interfering cells comprises determining the optimal beam sequences and communicating said beam sequences in one base station and then transmitting or broadcasting from said base station by direct inter-base station communication.

In a preferred embodiment of the present invention, a hierarchical solution is used to find a suboptimal solution of cells' beam patterns, by letting some cells carry out a round robin beam pattern selection for all the beam patterns which have active mobile terminals, and letting their neighbour interfering cells coordinate to select their optimal beam patterns that achieve a reduced localised inter-cell interference. In this way, the suboptimal solution for the whole network is found and the vast signalling overhead that would be present in a network of many cells is reduced.

The method for scheduling resources in a multi-cellular wireless communication system may further comprise the steps of: appending a scheduling scheme such as Proportional Fair scheduling in both Time and Frequency domain (PFTF) to a mobile terminal for each specific slot, achieving improved distribution of use of resources.

BRIEF DESCRIPTION OF THE DRAWINGS

For a more complete understanding of the present invention, reference is now made to the following description taken in conjunction with the accompanying drawings.

DETAILED DESCRIPTION OF EMBODIMENTS OF THE INVENTION

An embodiment of the present invention will now be described with reference to FIGS. 1 and 2.

Figure 1:
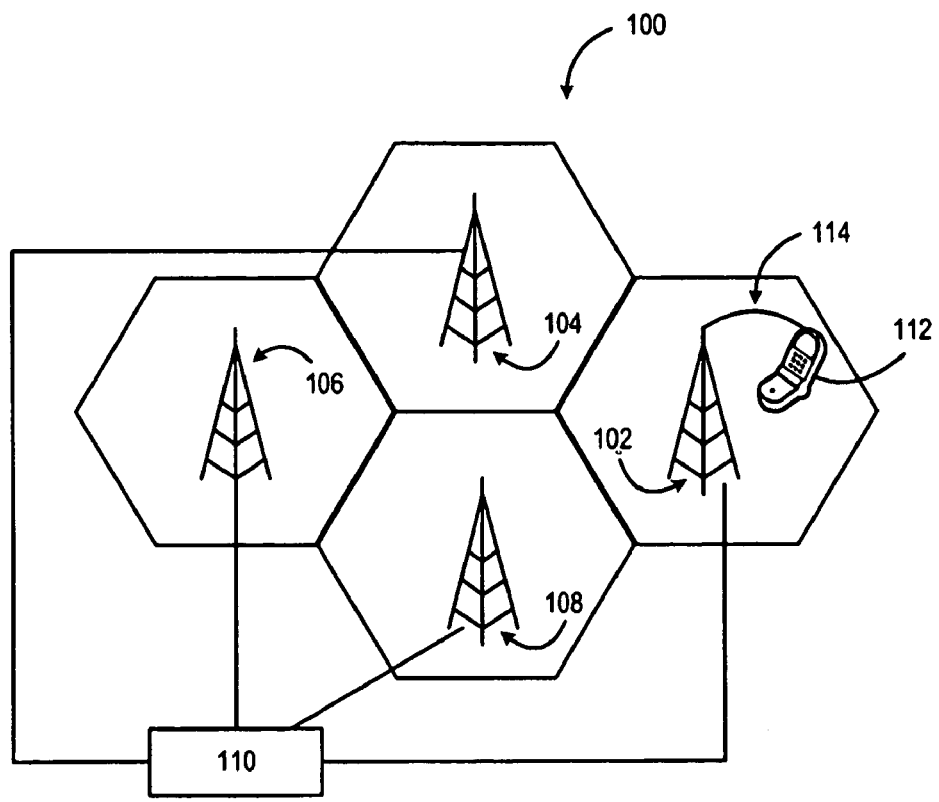
FIG. 1 is a schematic representation of a view of the overall network.

With reference to FIG. 1, the network 100 comprises a plurality of base stations 102, 104, 106 and 108. The base stations 102, 104, 106 and 108 are connected via a core network 110. A merely representative hexagonal grid is shown here to represent the coverage area of the base stations 102, 104, 106 and 108. The base station 102 communicates with the mobile terminal 112 via a wireless link 114. Signals are transmitted via the wireless link 114 from the base station 102 to the mobile terminal 112, i.e. a downlink or from the mobile terminal 102 to the base station 102, i.e. an uplink.

The configuration of the base stations 102, 104, 106 and 108 of the network 100 will now be described in more detail with reference to FIG. 2. For the purpose of a clear description, FIG. 2 will be described in terms of one base station 102.

Figure 2:
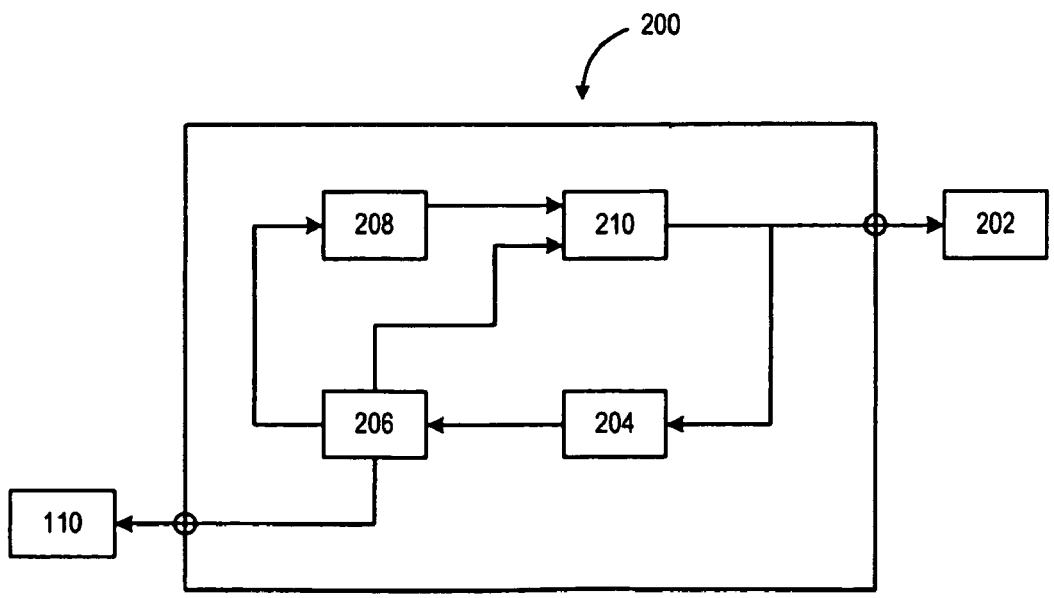
FIG. 2 is a simplified schematic block diagram representation of a base station according to an embodiment of the present invention.

The base station 102 of FIG. 2 comprises an antenna array 202, a radio frequency (RF) receiver 204, a controller 206, a radio frequency (RF) transmitter 208 and beam forming means 210. The antenna array 202 is connected to the RF receiver 204, which is in turn connected to the controller 206. The controller 206 is connected to the core network 110. The base station 102 therefore communicates with the core network 110 via the controller 206. Similarly, the core network 110 communicates with the base station 102 via the controller 206. The controller 206 is also connected to the RF transmitter 208, which is in turn connected to the beam forming means 210. The controller 206 is also connected to the beam forming means 210. The beam forming means 210 is connected to the antenna array 202. The beam forming means 210 is operable to form beam patterns to be transmitted by the antenna array 202. The mobile terminal 112 that is communicating with the base station 102 is associated with one of the beam patterns.

A process that is carried out in each of the base stations 102, 104, 106 and 108 will now be described in detail with reference to FIG. 3. The process of FIG. 3 refers to a process carried out in the base stations 102, 104, 106 and 108 when a non-cooperative scheduling scheme is employed. For the purpose of a clear description, the process will be discussed in terms of base station 102.

Initially, in step 302, the beam patterns are formed at the beam forming means 210 and forwarded to the antenna array 202 for transmission. The beam forming method employed by the beam forming means 210 may be one of those mentioned previously, namely fixed beam forming or adaptive beam forming, or some other suitable beam forming scheme.

The formed beam patterns are then signalled to the neighbouring base stations 104, 106 and 108 through pilots, step 304.

The base station 102 adds the formed beam patterns to a list of stored beam patterns, step 306.

A mobile terminal 112 is then chosen for establishing a communication with the base station 102, step 308.

Next, channel measurements and measurement reports are received at the RF receiver 204 of the base station 102, from the mobile terminal 112, step 310. The channel measurements and measurement reports are sent from the RF receiver 204 to the controller 206.

The optimum beam pattern for the mobile terminal 112 is then determined by the controller 206, based on the information that was obtained in step 310, step 312. In other words, the beam pattern associated with the mobile terminal 112 is identified. The method to obtain the optimum beam pattern is dependent on the beam forming method that was previously employed in step 302. If the fixed beam forming method was employed in step 302, the optimum beam pattern is chosen from the set of predefined beams. If the adaptive beam forming method was employed in step 302, the determination of the optimum beam pattern is based on the eigen-direction of the channel of the mobile terminal 112. The fixed beam forming method and the adaptive beam forming method are merely examples of many different types of methods that may be employed.

The mobile terminal 112 is added to the beam pattern (on the list of stored beam patterns) that was previously determined to be optimum in step 312, step 314. The process defined by steps 308 through 314 is repeated for each mobile terminal that requests communication with the base station 102. A complete list of beam patterns and their associated mobile terminals is thus formed.

The traffic load is then determined for each beam pattern on the list of beam patterns, in step 316. The traffic load of a particular beam pattern will depend on the number of mobile terminals associated with the beam pattern and the load that each of the mobile terminals contributes to the beam.

The beam patterns having a uniform traffic load are then determined, step 318. In other words, it is determined whether the beam patterns have the same traffic load. If the beam patterns are determined to have a uniform traffic load, step 320 is followed.

In step 320, a round-robin mechanism is used to assign a beam pattern to a slot. In the round-robin mechanism, a beam pattern is chosen from the list of beam patterns created in step 306. The chosen beam pattern is assigned to a slot based on certain predefined orders or rules. The next beam pattern is chosen from the list and the process is repeated. If the beam patterns are determined to have a non-uniform traffic load (i.e. different traffic loads), step 322 is followed.

Figure 4:
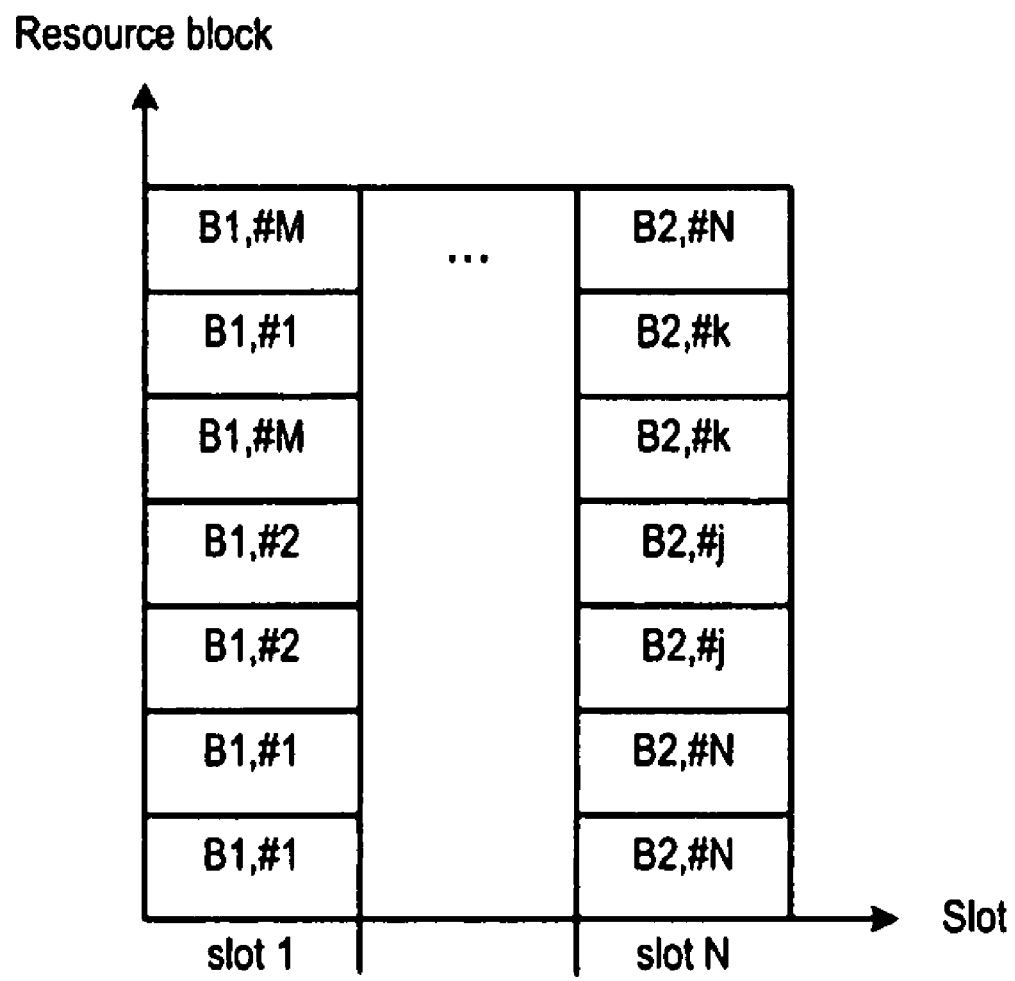
FIG. 4 is an example of a schedule having only one beam pattern per slot according to an embodiment of the present invention.

If the traffic load is non-uniform, each beam pattern on the list of beam patterns is assigned to a slot based on the traffic load of the beam patterns, step 322. For example, beam patterns having a higher traffic load are scheduled (i.e. assigned a slot) as a priority. Once all the beam patterns have been assigned to a slot (using either the round robin approach in step 320 or the traffic load approach in step 322), step 324 is followed. The result of step 320 or 322 is that only one beam pattern is assigned to each slot, as shown in FIG. 4. In the example shown in FIG. 4, beam pattern 1 (B1) has been assigned to slot 1 and beam pattern 2 (B2) has been assigned to slot N. Although one beam pattern is assigned to each slot, this single beam pattern may comprise two polarizations (+/− 45° or V/H) formed in the same direction.

Each slot is divided into a plurality of physical resource blocks. The resource blocks may, for example, be time-frequency resource blocks for the case of the OFDM system or codes for the case of the CDMA system. It is to be noted, however, that the resource blocks are not limited to these examples and other physical resource blocks are possible depending on the system that is applied.

A scheduling scheme is applied to schedule the resource blocks of each slot to the mobile terminals to be served during each slot, step 324. In other words, the plurality of resource blocks are scheduled to the different mobile terminals that are associated with each beam pattern. For example, referring to FIG. 4, the mobile terminals #1 to #M that are associated with the same beam pattern (beam pattern 1) are scheduled on the resource blocks of the first slot. The scheduling schemes used to schedule the resource blocks to the mobile terminals may be one of a plurality of scheduling schemes. An example will be provided for the purpose of the description. However, the scheduling scheme used is not limited to the example provided and any number of scheduling schemes could be applied.

As an example, an OFDMA system will be considered. It should, however, be noted that the present invention is not limited to an OFDMA system, but is also applicable to other systems, such as Time Division Multiple Access (TDMA) and Code Division Multiple Access (CDMA). For the OFDMA system example, a frequency domain scheduling scheme such as proportional fair scheduling in both time and frequency domain (PFTF) could be applied as the scheduling scheme.

The basic idea of the PFTF scheduling scheme is that a mobile terminal is scheduled on a resource block when it is in instantaneously favourable conditions with respect to its mean. For example, assuming only one mobile terminal can be served by one beam pattern on each resource block, a user u is scheduled from a pool of $N_{queued}$ users on resource block k according to the following criteria:

$$J^{(u,k)} = \underset{u \in [1, \ldots N_{queued}]}{\mathrm{argmax}} \left\{ \frac{TP_p^{u,k}}{\overline{TP}^u} \right\}$$

where $TP_p^{u,k}$ is the estimated throughput for user u with beam pattern p on resource block k at the given time instance, and $\overline{TP}^u$ is the mean throughput for user u during the past time T.

In an alternative embodiment, a process carried out in each of the base stations 102, 104, 106 and 108 will now be described in detail with reference to FIG. 5. The process of FIG. 5 refers to a process carried out in the base stations 102, 104, 106 and 108 when a cooperative scheduling scheme is employed. For the purpose of a clear description, the process will be discussed in terms of base station 102.

Figure 3:
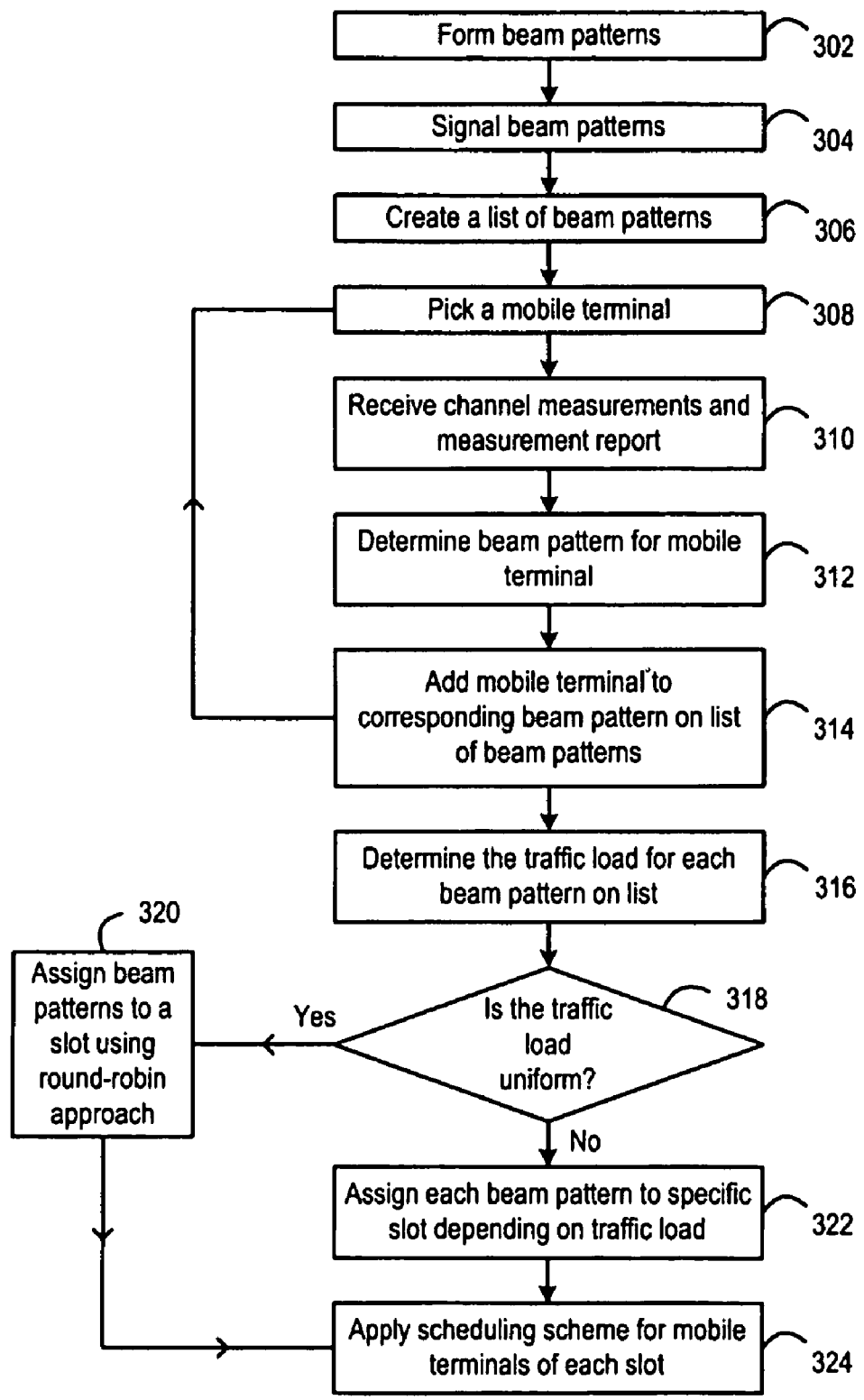
FIG. 3 is a flow diagram of a process carried out by the base stations when a non-cooperative scheduling scheme according to an embodiment of the present invention.

Firstly, the process described in steps 302 through 314 of FIG. 3 is carried out in each of the base stations 102, 104, 106 and 108, the only difference being that the beam patterns are signalled to the neighbouring base stations through inter-cell communication in step 304.

Figure 5:
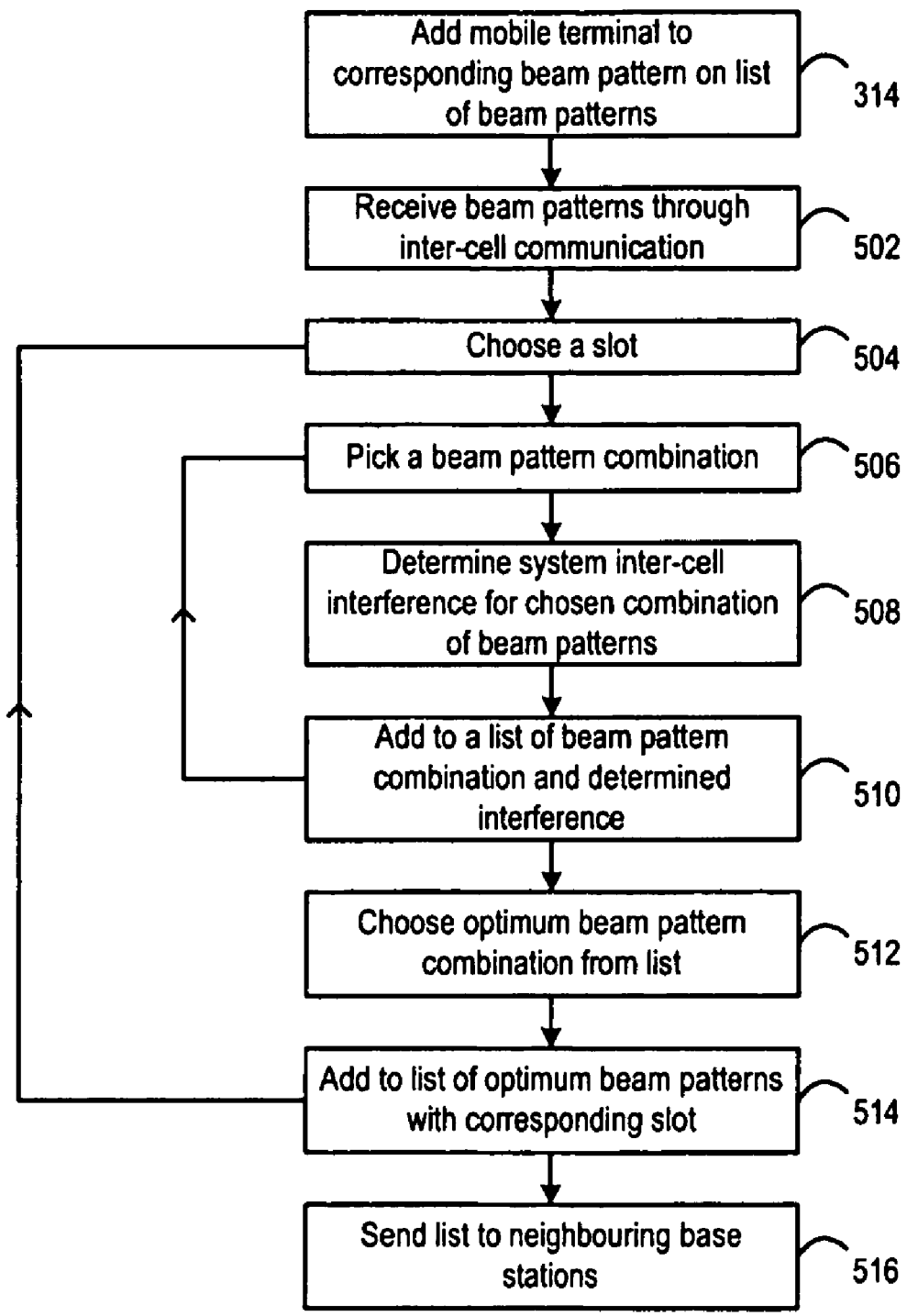
FIG. 5 is a flow diagram of a process carried out in a base station when a cooperative scheduling scheme is applied according to an alternative embodiment of the present invention.

On completion of steps 302 through 314 of FIG. 3, the process shown in FIG. 5 is then carried out in the cooperative scheme. The process of FIG. 5 is carried out in a single chosen base station, for example base station 102.

Firstly, beam patterns from the neighbouring base stations are received at the RF receiver 204 of the base station 102 through inter-cell communication, step 502. The beam patterns are sent from the RF receiver 204 to the controller 206 and a slot is chosen, step 504.

A combination of beam patterns is chosen from the beam patterns received from the neighbouring base stations, step 506. In other words, one beam pattern is chosen from each base station.

The system inter-cell interference is then determined for the chosen slot for the combination of beam patterns chosen in step 506, step 508.

The chosen beam pattern combination is then added to a list together with the determined system inter-cell interference, step 510. The process described by steps 506 through 510 is then repeated for every combination of beam patterns. A complete list of beam pattern combinations from the neighbouring base stations and the corresponding system inter-cell interference for each combination is thus formed.

Figure 6:
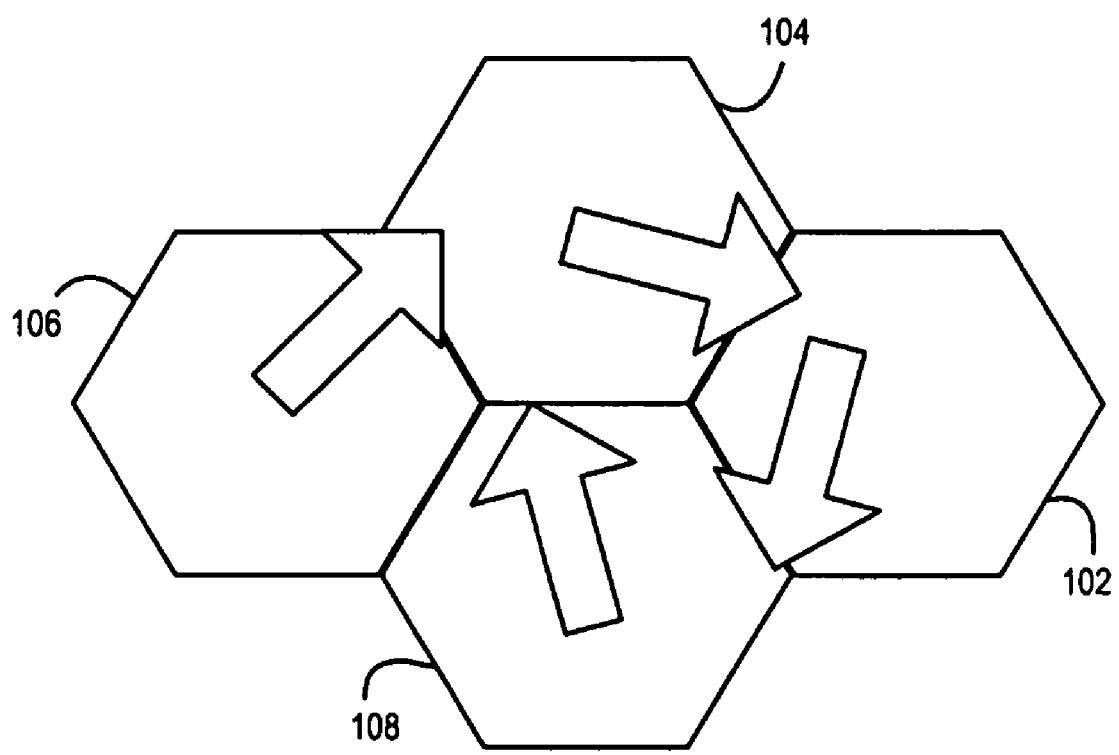
FIG. 6 is an example of a beam pattern combination chosen with the minimum system inter-cell interference according to the alternative embodiment of the present invention.

The optimum beam pattern combination is then chosen from the list of beam pattern combinations formed in step 510, step 512. The optimum beam pattern combination is the beam pattern combination with the minimum system inter-cell interference. An example of a combination of beam patterns for a four-cell scenario (i.e. base stations 102, 104, 106 and 108) is shown in FIG. 6. The beam pattern combination that is shown in FIG. 6 is an example of the beam pattern combination with the weakest (i.e. minimum) inter-cell interference.

One alternative to obtaining the minimum system inter-cell interference in steps 508 through 512 would be to obtain the maximum system throughput. The criteria to obtain the maximum system throughput of all the M interfering cells for T slots is given by:

$$\max_{beam^1_{cell\_i} \in (1,2,\ldots,N\_beam)} \sum_{t=1}^{T} \sum_{cell\_i=1}^{M} Throughput(beam^1_{cell\_i})$$

wherein $beam_{cell\_i}{}^t$ is the selected beam of cell_i for the t slot.

There may be other criteria to satisfy, for example, fair services for all the beams, in which case they can be treated as the subject conditions to the above formula. The criteria to obtain the maximum system throughput, subject to a constraint on the proportional service for the available beams for T slots is given by:

$$\max_{beam^1_{cell\_i} \in (1,2,\ldots,N\_beam)} \sum_{t=1}^{T} \sum_{cell\_i=1}^{M} Throughput(beam^1_{cell\_i})$$

$$sub. \sum_{t=1}^{T} Throughpout(beam^1_{cell\_i}):$$

$$\sum_{t=1}^{T} Throughput(beam^2_{cell\_i}): \sum_{t=1}^{T} Throughput(beam^{N\_beam}_{cell\_i}) =$$

$$\gamma^1_{cell\_i}: \gamma^2_{cell\_i}: \ldots :\gamma^{N\_\in}_{cell\_}$$

It is to be understood that the method of determining the optimum beam pattern combination is not limited to obtaining the minimum system inter-cell interference or the maximum system throughput. A number of other alternative methods may be used by those skilled in the art.

The optimum beam pattern combination obtained in step 512 is then added to a list with the corresponding slot that was chosen in step 504, step 514. The process described by steps 504 through 514 is then repeated for any desired number of slots. A complete list of slots and the corresponding optimum beam pattern combination for each slot is then obtained.

The list of slots and corresponding optimum beam pattern combinations for each slot is signalled to the other base stations 104, 106 and 108, step 516.

Figure 7:
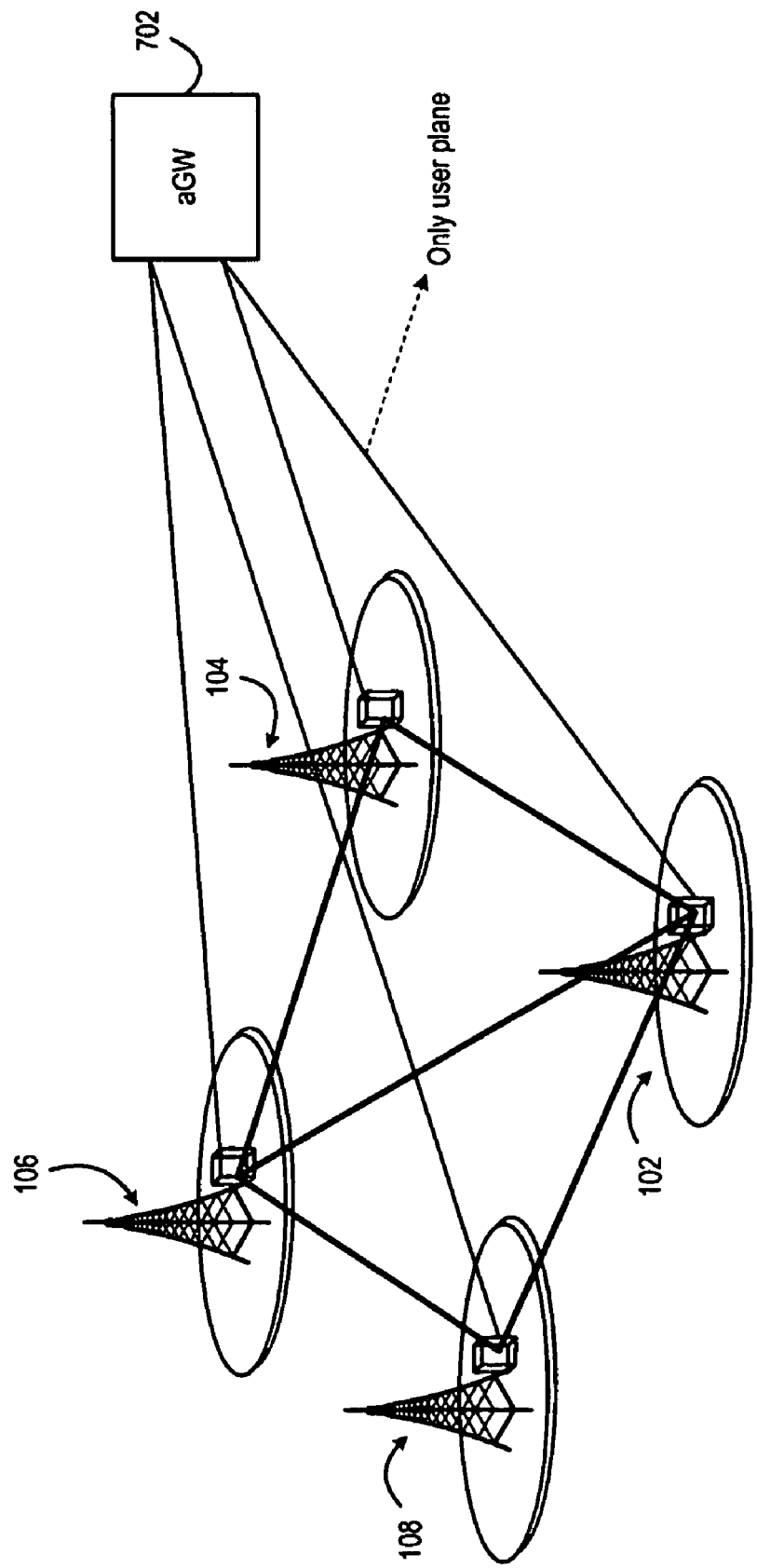
FIG. 7 is an example of a distributed Radio Access Network (RAN) architecture.
Figure 8:
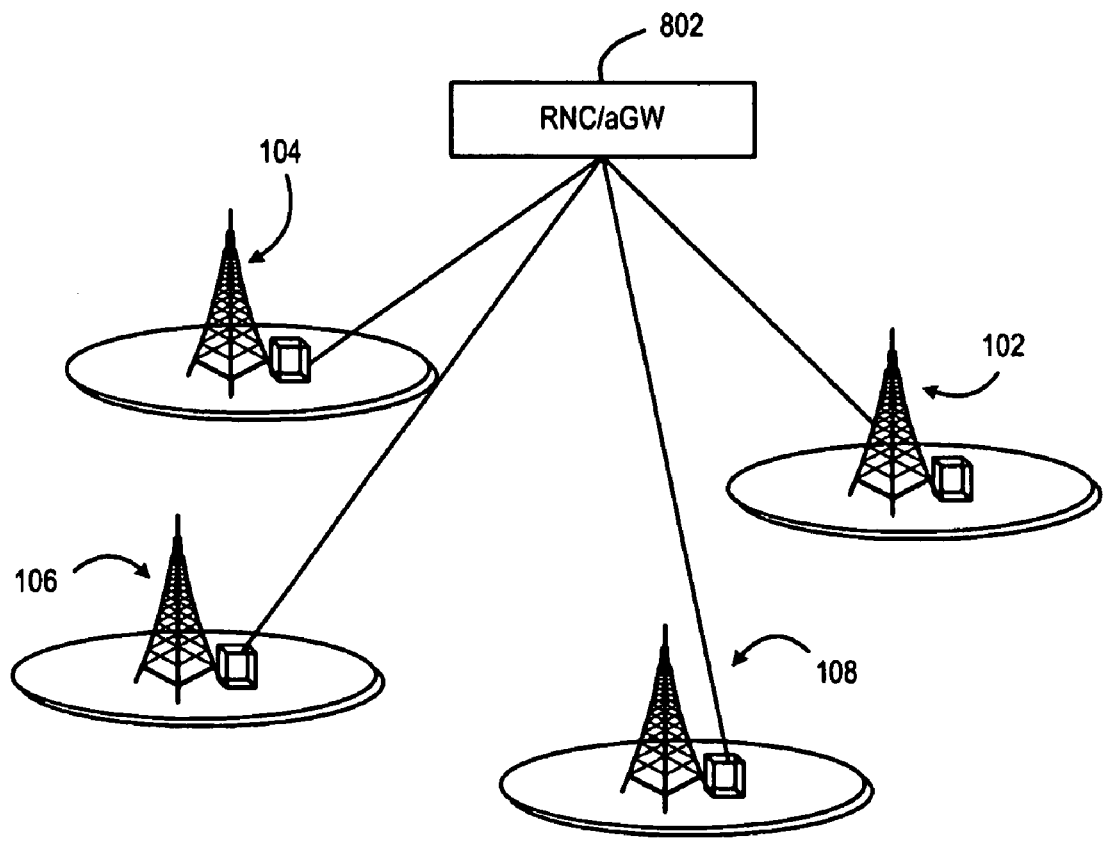
FIG. 8 is an example of a centralized Radio Access Network (RAN) architecture.

The process of FIG. 5 has been described as being carried out in a specific base station 102, i.e. is based on distributed Radio Access Network (RAN) architecture. In the distributed RAN architecture there are direct links among the base stations 102, 104, 106 and 108 and the information exchange occurs through direct inter-base station communication, as shown in FIG. 7. Alternatively, the process of FIG. 5 may be carried out in a centralized element 702, with information exchange occurring between base stations. An alternative to this architecture is a centralized RAN architecture, as shown in FIG. 8. In the centralized RAN architecture, a central unit 802 carries out the process illustrated in FIG. 5. The central unit could comprise elements such as a radio network controller (RNC) and an access gateway (aGW).

It is to be noted that if the base stations 102, 104, 106 and 108 were distributed and managed by different RNC/aGWs, the information of the interfering cells in the neighboring RNC/aGW could be exchanged through the communication among the RNC/aGWs.

Once the process shown in FIG. 5 is completed, the base stations 104, 106 and 108 receive the list of optimum beam patterns for each slot. Each base station 102, 104, 106 and 108 then schedules their optimum beam patterns in the corresponding slots.

Figure 9:
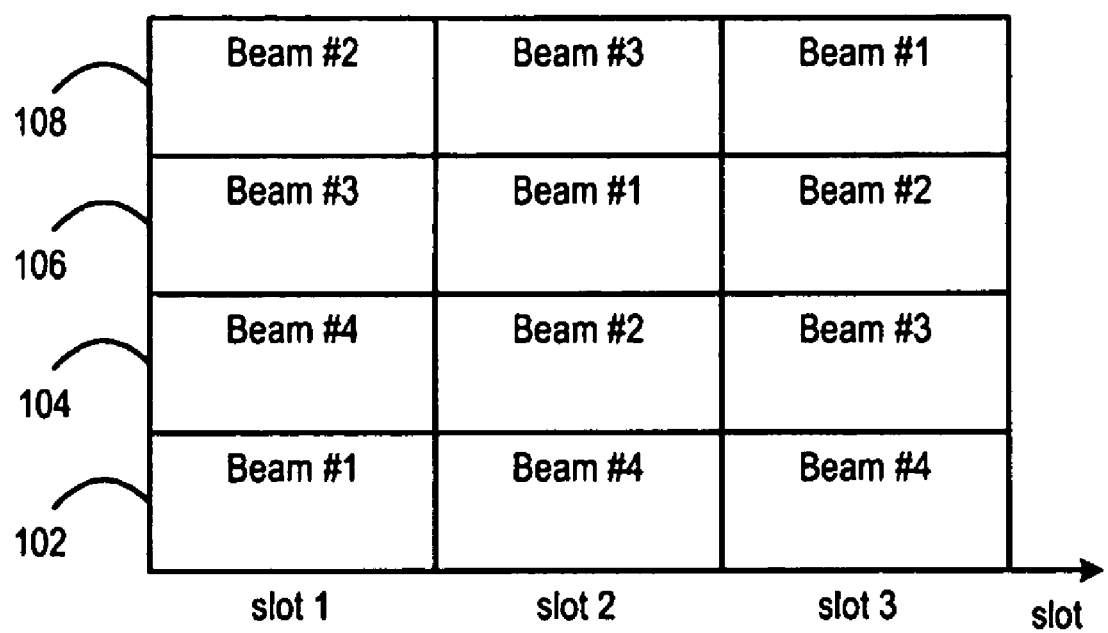
FIG. 9 is an example of a schedule of optimum beam patterns according to an embodiment of the present invention.

An example of the scheduled optimum beam patterns of the base stations 102, 104, 106 and 108 for each slot is shown in FIG. 9. For example, as shown in FIG. 9, for the first slot, base station 102 schedules its beam pattern #1, base station 104 schedules its beam pattern #4, base station 106 schedules its beam pattern #3 and base station 108 schedules its beam pattern #2.

For a system of many cells, a hierarchical solution may be used to find the suboptimal solution of cells' beam patterns. For example, some cells carry out a round robin beam pattern selection for all the beam patterns which have active mobile terminals, and their neighbor interfering cells coordinate to select their optimal beam patterns that achieve a reduced localised inter-cell interference.

Although embodiments of the present invention have been illustrated in the accompanying drawings and described in the foregoing description, it will be understood that the invention is not limited to the embodiments disclosed but capable of numerous modifications without departing from the scope of the invention as set out in the following claims.

The invention claimed is:

1. A method for scheduling resources in a multi-cellular wireless communication system, the method comprising the steps of:

identifying a beam pattern associated with at least one mobile terminal located within one of the cells;

assigning said identified beam pattern to a slot, said slot comprises a plurality of resource blocks, said identified beam pattern providing at least one stream to said at least one mobile terminal;

scheduling at least one other mobile terminal located within said cell having the same beam pattern associated therewith as that of said identified beam pattern to be served during said slot for a resource block;

determining optimal beam pattern sequences of all interfering cells for at least one subsequent slot, said determination being based on a pre-defined criteria; and communicating the selected beam pattern for each slot based on said determined beam pattern sequences to at least one interfering cell.

2. A method according to claim 1, wherein the method further comprises the step of: communicating said assigned beam pattern in said cell to at least one interfering cell for avoiding interference between cells of a multi-cellular wireless communication system.

3. A method according to claim 2, wherein the step of communicating said assigned beam pattern comprises communicating said assigned beam pattern using different pilots in each beam.

4. A method according to claim 2, wherein the step of communicating said assigned beam pattern comprises communicating said assigned beam pattern by inter-cell communication.

5. A method according to claim 1, wherein the step of assigning said identified beam pattern for each slot comprises assigning said identified beam pattern according to a round robin mechanism for all the beams having at least one active mobile terminal to cover.

6. A method according to claim 1, wherein the step of assigning said identified beam pattern for each slot comprises assigning said identified beam pattern based on the traffic load of each beam, such that beams having a higher load are scheduled as a priority.

7. A method according to claim 1, wherein the step of determining the optimal beam sequences for said at least one subsequent slot comprises determining the optimal beam pattern sequences based on the criteria of obtaining the maximum system throughput.

8. A method according to claim 1, wherein the step of determining the optimal beam pattern sequences for said at least one subsequent slot comprises determining the optimal beam pattern sequences based on the criteria of finding the beam pattern sequences with a minimum system inter-cell interference for each slot.

9. A method according to claim 1, wherein each cell decides its next best served beam patterns from the determined beam pattern sequences for the subsequent slot or slots based on the pre-defined criteria.

10. A method according to claim 1, wherein the step of determining the optimal beam pattern sequences and the step of communicating the beam pattern sequences of the interfering cells comprises determining optimal beam pattern sequences and communicating said beam pattern sequences in at least one central node and then transmitting or broadcasting from said central node to all interfered cells.

11. A method according to claim 1, wherein the step of determining the optimal beam pattern sequences and the step of communicating the beam pattern sequences of the interfering cells comprises determining the optimal beam pattern sequences and communicating said beam pattern sequences in one base station and then transmitting or broadcasting from said base station by direct inter-base station communication.

12. A method according to claim 1, wherein a hierarchical solution is used to find a suboptimal solution of cells' beam patterns, by letting some target cells use a pre-assigned beam pattern selection for all beams which have active mobile terminals to cover, and let neighbour interfering cells coordinate to select their optimal beam patterns that achieve a reduced localised inter-cell interference.

13. A method according to claim 1, wherein the method further comprises the step of: appending a scheduling scheme such as Proportional Fair scheduling in both Time and Frequency domain (PFTF) to a mobile terminal for each specific slot.

14. Apparatus for scheduling resources in a multi-cellular wireless communication system, the apparatus comprising:
an identifier for identifying a beam pattern associated with at least one mobile terminal located within one of the cells;
means for assigning said identified beam pattern to a slot, said slot comprises a plurality of resource blocks, said identified beam pattern providing at least one stream to said at least one mobile terminal;
a scheduler for scheduling at least one other mobile terminal located within said cell having the same beam pattern associated therewith as that of said identified beam pattern to be served during said slot for a resource block;
means for determining optimal beam pattern sequences of all interfering cells for at least one subsequent slot, said determination being based on a pre-defined criteria; and
means for communicating the selected beam pattern for each slot based on said determined beam pattern sequences to at least one interfering cell.

15. Apparatus according to claim 14, wherein the apparatus further comprises: a communication means for communicating said assigned beam pattern in said cell to at least one interfering cell for avoiding interference between cells of a multi-cellular wireless communication system.

16. A wireless communication system comprising a plurality of cells, each cell comprising:
at least one mobile terminal located within one of said plurality of cells; and
a base station, said base station comprising:
an antenna array for transmitting at least one beam pattern;
a beam forming means for forming said at least one beam pattern;
an identifier for identifying a beam pattern transmitted by the antenna array associated with at least one mobile terminal located within one of the cells;
means for assigning said identified beam pattern to a slot, said slot comprises a plurality of resource blocks, said identified beam pattern providing at least one stream to said at least one mobile terminal;
a scheduler for scheduling at least one other mobile terminal located within said cell having the same beam pattern associated therewith as that of said identified beam pattern to be served during said slot for a resource block;
means for determining optimal beam pattern sequences of all interfering cells for at least one subsequent slot, said determination being based on a pre-defined criteria; and
means for communicating the selected beam pattern for each slot based on said determined beam pattern sequences to at least one interfering cell.

17. A wireless communication system according to claim 16 comprising a plurality of cells, wherein said base station of each cell further comprises: a communication means for communicating said assigned beam pattern in said cell to at least one interfering cell.

18. A system according to claim 16, wherein said beam forming means forms beams using fixed beam forming.

19. A system according to claim 16, wherein said beam forming means forms beams using adaptive beam forming.

20. A system according to claim 16, wherein wireless communication is Orthogonal Frequency Division Multiple Access.

21. A method for scheduling resources in a multi-carrier cellular radio system with a multi-user smart antenna system comprising:
assigning one beam pattern for each slot of a sub-carrier, said beam pattern allows bearing of one or several streams to one or several users;
selecting users with the same beam orientation as candidates to be served during each slot;
communicating the assigned beam pattern or beam orientation in a specific cell to interfering cells such that inter-cell interference can be avoided; and
whereby optimal beam sequences of all interfering cells for one or several following slots are calculated and the selected beam pattern for each slot based on said calculated beam sequences are then communicated to each cell, and said selection is based on a pre-defined criteria.

22. A method according to claim 21 whereby the beam pattern or beam orientation in a specific cell is communicated to interfering cells by using different dedicated pilots in each beam.

23. A method according to claim 21 whereby the beam pattern or beam orientation in a specific cell is communicated to interfering cells by inter-cell communication.

24. A method according to claim 21, whereby the assignment of one beam pattern for each slot is carried out as a round robin beam selection for all the beams which have active users to cover.

25. A method according to claim 21, whereby the assignment of one beam pattern for each slot is based on the traffic load carried by each beam, such that the beams that have higher load to carry are more likely to be scheduled.

26. A method according to claim 21, whereby the beam selection for one or several following slots is based on the criteria of obtaining maximum system throughput.

27. A method according to claim 21, whereby the beam selection for one or several following slots is based on the criteria of finding the cells beam sequences with a minimum of system inter-cell interference for each slot.

28. A method according to claim 21, whereby each cell decides its next best served beams from the calculated beam sequences for the next slot or slots based on the pre-defined criteria.

29. A method according to claim 21, whereby the calculation of the optimal beam sequences and the communication of the interfering cells beam sequences is carried out in one or more central node and are then transmitted or broadcast from said central node to all interfered cells.

30. A method according to claim 21, whereby the communication of the interfering cells beam sequences is carried out by direct inter-base station communication.

31. A method according to claim 21, whereby a hierarchical solution is used to find a suboptimal solution of cells' beam patterns, by letting some target cells use a pre-assigned beam selection for all the beams which have active users to cover, and let their neighbor interfering cells coordinate to reduce the localized inter-cell interference.

32. A method according to claim 21, whereby a scheduling scheme such as Proportional fair scheduling in both time and frequency domain (PFTF) is appended to the selected user for each specific slot.

* * * * *

UNITED STATES PATENT AND TRADEMARK OFFICE
CERTIFICATE OF CORRECTION

PATENT NO. : 8,385,939 B2  
APPLICATION NO. : 12/377534  
DATED : February 26, 2013  
INVENTOR(S) : Liao et al.

Page 1 of 1

It is certified that error appears in the above-identified patent and that said Letters Patent is hereby corrected as shown below:

In the Specification

In Column 2, Line 58, delete "22-25" and insert -- 22-25, --, therefor.

In Column 9, Line 42, delete "$sub. \sum_{i=1}^{r} Throughput(beam_{cell\_i}^1):$" and insert -- $sub. \sum_{i=1}^{r} Throughput(beam_{cell\_i}^1):$ --, therefor.

In Column 9, Line 47, delete "$\ldots : \gamma_{cell\_}^{N\_c}$" and insert -- $\ldots : \gamma_{cell\_i}^{N\_t}$ --, therefor.

In the Claims

In Column 14, Lines 20-21, in Claim 32,  
delete "fair scheduling in both time and frequency" and  
insert -- Fair scheduling in both Time and Frequency --, therefor.

Signed and Sealed this  
Twenty-sixth Day of August, 2014

Michelle K. Lee  
*Deputy Director of the United States Patent and Trademark Office*